United States Patent [19]
Arlaud

[11] 3,783,691
[45] Jan. 8, 1974

[54] THERMOCOUPLE PROBE FOR TEMPERATURE MEASUREMENT

[75] Inventor: Jean-Claude Arlaud, Aix-en-Provence, France

[73] Assignee: Commissariat A L'Energy Atomique, Paris, France

[22] Filed: Jan. 29, 1973

[21] Appl. No.: 327,727

[30] Foreign Application Priority Data
Feb. 1, 1972  France .............................. 7203250

[52] U.S. Cl...................... 73/341, 73/359, 136/233, 136/234
[51] Int. Cl............................ G01k 3/06, G01k 7/08
[58] Field of Search.................. 73/341, 359, 343 R; 136/233, 234

[56] References Cited
UNITED STATES PATENTS
764,178  7/1904  Bristol................................. 73/359
885,430  4/1908  Bristol................................. 136/234

Primary Examiner—Richard C. Queisser
Assistant Examiner—Denis E. Corr
Attorney—Flynn & Frishauf

[57] ABSTRACT

A thermocouple probe for the indication of temperature over a wide range of values has a hot junction which can readily be displaced. The thermocouple comprises a tube which is suspended from a stationary pressure chamber but electrically insulated therefrom and which contains in the lower portion thereof a liquid having good electrical conductivity and supplied from a reservoir, two electrically conductive wires formed of different metals and connected at the upper ends thereof to a voltmeter whilst the lower ends are immersed in said liquid, and pneumatic means for displacing the level of the free surface of the liquid within the tube, said tube being formed of material which is compatible with the liquid.

3 Claims, 1 Drawing Figure

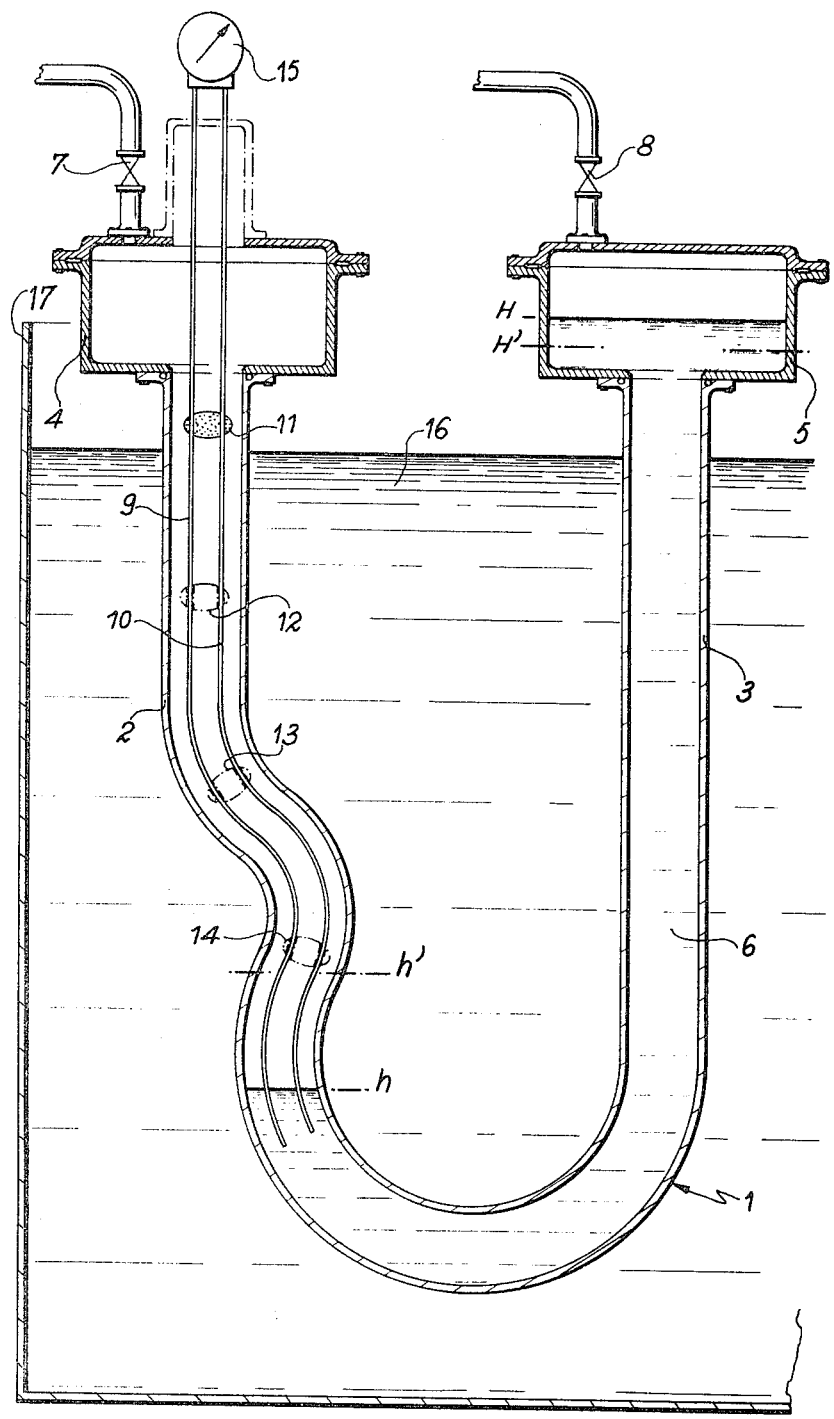

THERMOCOUPLE PROBE FOR TEMPERATURE MEASUREMENT

This invention relates to a thermometer probe fitted with a thermocouple in which the position of the hot junction can readily be adjusted.

A conventional thermocouple probe permits determination of temperature values in the vicinity of its hot junction. In consequence, a number of thermocouples must be employed if it is desired to scan a whole range of temperatures within a portion of the space or alternatively, if one thermocouple is employed alone, it has to be displaced.

The invention overcomes these disadvantages and is accordingly directed to a thermocouple probe which is essentially characterized in that it comprises a tube which is suspended from a stationary unit but electrically insulated therefrom and which contains in the lower portion thereof a liquid having good electrical conductivity and supplied from a reservoir, two electrically conductive wires formed of different metals and placed within said tube, said wires being maintained in spaced relation by elements of insulating material and connected at the upper ends thereof to a voltmeter located externally of said stationary unit whilst the lower ends thereof are immersed in said liquid, and pneumatic means for displacing the level of the free surface of said liquid within said tube, said tube being formed of material which is compatible with said liquid, the assembly being such that said free surface constitutes the hot junction of the thermocouple whilst the cold junction thereof is located outside said tube and that the level of said hot junction can be modified at will by said pneumatic means and that a whole series of temperature determinations can consequently be carried out at different points without displacing the apparatus.

In accordance with the invention, the tube can have any desired shape in order to be in thermal equilibrium at each point thereof with the points of the liquid or gaseous medium at which locally variable temperatures are to be measured. As a preferable feature, said tube is also flexible.

In one advantageous embodiment, the tube aforesaid is one of the two arms of a U-shaped conduit whilst the other arm constitutes said reservoir and is suspended from a second stationary unit, the two stationary units being pressure chambers and operation of these latter being carried out by means of a gas which is neutral with respect to the liquid contained in the tube. The U-shaped conduit is accordingly immersed in the liquid or the gas whose temperature is to be measured.

Further properties and advantages of the present invention will be brought out by the following description which will be given with reference to the single accompanying FIGURE and in which one embodiment of the invention is given by way of explanation without any limitation being implied. In this FIGURE, the tube is U-shaped and is immersed in a liquid having a temperature which is variable from one point to another.

As shown in this FIGURE, the thermometer probe in accordance with the invention comprises a U-shaped conduit 1 which is suspended by one of its vertical arms 2 from a pressure chamber 4 and by its other vertical arm 3 from a pressure chamber 5.

The conduit 1 contains a liquid 6 having good electrical conductivity (liquid sodium or mercury, for example) and a gas which is neutral with respect to said liquid is present above this latter within the two arms of the U.

The level of the two free surfaces of said liquid can be modified at will by means of the valves 7 and 8 and thus displaced downwards, for example, from the levels H and h to the levels H' and h'.

Two electrically conductive wires 9 and 10 formed of different metals such as the chromium-alumel couple or the nickel-constantan couple, for example, are placed within the arm 2.

Said wires are connected at the upper ends thereof and outside the chamber 4 to a voltmeter 15 which is graduated in temperatures and immersed in the liquid 6 at the lower ends thereof.

Insulating beads 11 to 14 of procelain, for example, prevent any contact between the two wires aforesaid. The conduit 1 is immersed in a liquid 16 which is present within the tank 17; said liquid 16 is in the hot state and has a high vertical temperature gradient.

The conduit 1 is formed of material which affords resistance to the oxidizing action of the liquid 6 and can accordingly be constructed of stainless steel if said liquid is sodium; moreover, the conduit is electrically insulated from the pressure chambers 4 and 5 and must be capable of withstanding without damage the temperatures of the space in which temperature determinations are performed. Electrical insulation of the conduit 1 with respect to the chambers 4 and 5 is provided by any known means and is made necessary in order to prevent the thermocouple circuit from being closed by the liquid 6 and the conduit 1 itself. The cold source of the thermocouple is not illustrated but is placed outside the tank 17 at ambient temperature, for example.

The conduit 1 can be flexible: this flexibility can be ensured either by means of a thin-walled tube, for example, or by selecting suitable material for the fabrication of the tube or alternatively by making provision for a bellows element.

The operation of the probe in accordance with the invention is extremely simple. Thus, when said probe is placed in the zone in which it is desired to carry out temperature determinations, the level of the liquid 6 within the tube arm 2 is brought to any desired point of said zone and adjusted by means of the valves 7, 8.

Since the temperature of the cold junction of the thermocouple (which is located outside the apparatus) is maintained practically constant during the measuring operations by means of the voltmeter 15, the potential difference produced is proportional to the temperature of the hot junction as constituted by the free surface of the liquid 6 within the tube arm 2, that is to say practically at the temperature of the zone of the liquid 16 which immediately surrounds the arm 2 at the level of said free surface.

It must be clearly emphasized that the free surface of said liquid constitutes the hot junction and that the temperature reading (on the voltmeter 15 which is graduated in temperatures) is practically not influenced by the temperature of the zone corresponding to that portion of the wires 9 and 10 which is immersed in the liquid 6.

If a series of temperature determinations is carried out by varying the level of the liquid 6 within the tube arm 2 between h and h', the temperature reading which corresponds to each successive level is not disturbed in any way by the temperatures which were previously determined.

When it is desired to change from one measurement zone to another, it is only necessary to change the level of the liquid 6 within the tube arm 2 but it is preferable to establish between the chambers 4 and 5 a pressure difference of sufficiently low value to prevent any generation of oscillations which would make it necessary to wait until the liquid 6 is restored to a state of equilibrium.

What we claim is:

1. A thermometer probe fitted with a thermocouple wherein said probe essentially comprises a tube which is immersed in the medium whose temperature is to be measured locally, said tube being suspended from a stationary unit from which it is electrically insulated and intended to contain in the lower portion thereof a liquid having good electrical conductivity and supplied from a reservoir, two electrically conductive wires formed of different metals and housed within said tube, said wires being maintained in spaced relation by elements of insulating material and connected at the upper ends thereof to a voltmeter located externally of said stationary unit whilst the lower ends thereof are immersed in said liquid below a free surface thereof, and pneumatic means for displacing the level of the free surface of said liquid within said tube, said tube being formed of material which is compatible with said liquid, the assembly being such that said free surface constitutes the hot junction of the thermocouple and that the level of said hot junction can be modified at will by said pneumatic means and that a whole series of temperature determinations can consequently be carried out at different points without displacing the apparatus.

2. A thermometer probe according to claim 1, wherein said tube is one of the two arms of a U-shaped conduit whilst the other arm constitutes said reservoir and is suspended from a second stationary unit, the two stationary units being pressure chambers which operate by means of a gas which is neutral with respect to the liquid.

3. A thermometer probe according to claim 1 or claim 2, wherein said tube is flexible.

* * * * *